(12) United States Patent
Wei et al.

(10) Patent No.: US 9,717,033 B2
(45) Date of Patent: Jul. 25, 2017

(54) ACCESS POINT AND ASSOCIATED ANTENNA SELECTING METHOD

(71) Applicant: Wistron NeWeb Corporation, Hsinchu (TW)

(72) Inventors: Ya-Ping Wei, Hsinchu (TW); Fu-Ming Kang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 37 days.

(21) Appl. No.: 14/880,288

(22) Filed: Oct. 12, 2015

(65) Prior Publication Data

US 2016/0277993 A1    Sep. 22, 2016

(30) Foreign Application Priority Data

Mar. 20, 2015    (TW) .............................. 104109080 A

(51) Int. Cl.
*H04W 40/06*    (2009.01)
*H04L 1/00*    (2006.01)
*H04B 7/08*    (2006.01)

(52) U.S. Cl.
CPC .......... *H04W 40/06* (2013.01); *H04B 7/0808* (2013.01); *H04L 1/00* (2013.01)

(58) Field of Classification Search
None
See application file for complete search history.

(56) References Cited

U.S. PATENT DOCUMENTS

| 9,312,985 B2* | 4/2016 | Sanderovich ......... H04L 1/0015 |
| 2005/0037822 A1* | 2/2005 | Regnier ............... H01Q 1/2258 455/575.5 |

FOREIGN PATENT DOCUMENTS

CN    101305525 A    11/2008

* cited by examiner

*Primary Examiner* — Anh-Ngoc Nguyen
(74) *Attorney, Agent, or Firm* — Winston Hsu

(57) ABSTRACT

An access point includes an antenna module, a wireless network module and a processor, wherein the processor includes a plurality of Modulation and Coding Scheme code (MCS) codes supported by the electronic device. When the access point operates in a training stage for determining at least one optimal antenna adapted to the electronic device, the processor uses a specific MCS code from the plurality of MCS codes to transmit the plurality of training packets to the electronic device via the antenna module and the wireless network module without switching the other MCS codes for determining the at least one optimal antenna adapted to the electronic device.

14 Claims, 3 Drawing Sheets

ACCESS POINT AND ASSOCIATED ANTENNA SELECTING METHOD

BACKGROUND OF THE INVENTION

1. Field of the Invention

The present invention relates to an access point, and more particularly, to a method of selecting at least one optimal antenna from an antenna group of the access point.

2. Description of the Prior Art

When an electronic device such as a laptop, smart phone or tablet connects to an access point having a plurality of antennas, the access point performs a training procedure for transmitting a plurality of training packets to the electronic device. According to the response of the electronic device to the plurality of training packets, the access point then determines an optimal antenna for the electronic device or an optimal directionality of the antenna which can achieve the best connection quality.

In the abovementioned training procedure, switching different antennas according to a table including a plurality of Modulation and Coding Scheme code (MCS) codes supported by the electronic device is performed to confirm the selected antenna is the optimal one. If, however, the connecting quality is poor during the training procedure or the number of the supported MCS code is large, the antenna selecting performance will be affected and the training time will thereby being prolonged.

SUMMARY OF THE INVENTION

One of the objectives of the present invention is to provide a method of selecting an optimal antenna of a set of optimal antennas from an antenna group of the access point, wherein the method can reduce the executing time of the training procedure in order to solve the problems in the prior art.

According to an embodiment of the present invention, an access point comprises an antenna module, a wireless network module and a processor, wherein the processor includes a plurality of Modulation and Coding Scheme code (MCS) codes supported by the electronic device. When the access point is operating in a training stage to determine at least one optimal antenna adapted to the electronic device, the processor uses a specific MCS code from the plurality of MCS codes to transmit a plurality of training packets to the electronic device via the wireless network module without switching other MCS codes for determining the at least one optimal antenna adapted to the electronic device.

According to another embodiment of the present invention, an antenna selecting method is applied in an access point, wherein the access point for communicating with an electronic device comprises a plurality of Modulation and Coding Scheme code (MCS) codes supported by the electronic device, and further comprises an antenna module comprising a plurality of antennas, and the antenna selecting method comprises: connecting with the electronic device and operating in a training stage; using a specific MCS code from the plurality of MCS codes to transmit a plurality of training packets to the electronic device without switching other MCS codes; and determining at least one optimal antenna according to a response to the electronic device, wherein the response is corresponding to the plurality of training packets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
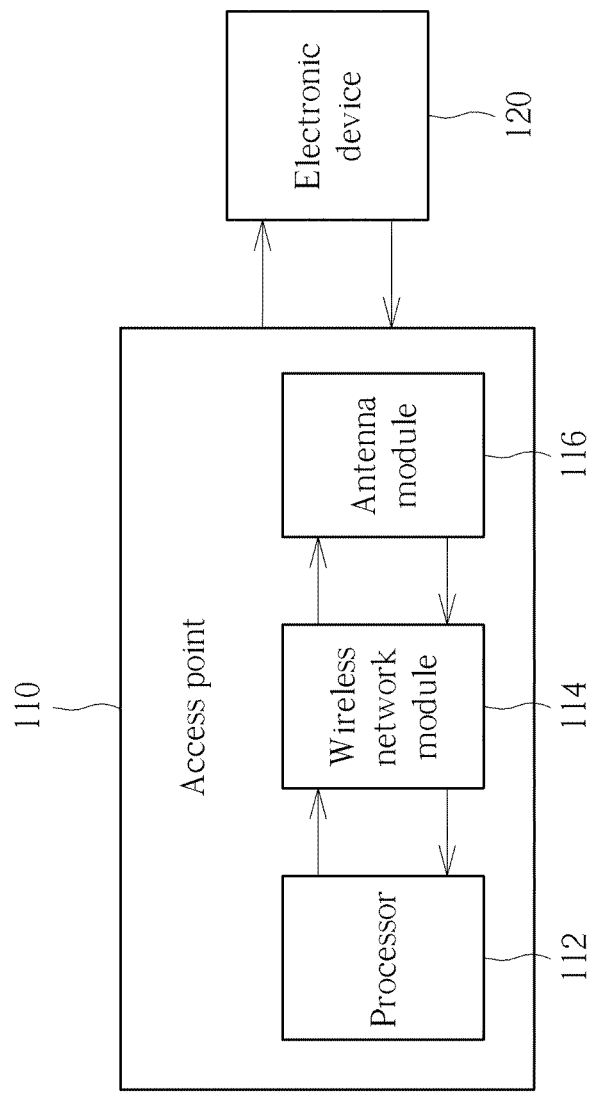
FIG. 1 is a diagram illustrating an access point according to an embodiment of the present invention.

FIG. 1 is a diagram illustrating an access point 110 according to an embodiment of the present invention. The access point 110 is connected to the internet in a wired or wireless manner, and is an intermediary for the electronic device 120 to connect with other internet accessible devices in order to send information. The access point 110 comprises a processor 110, a wireless network module 114 and an antenna module 116, wherein the antenna module 116 comprises a plurality of antennas. In addition, in this embodiment, the plurality of antennas included within the antenna module 116 can be unidirectional, bidirectional or omnidirectional. In an embodiment, each antenna of the antenna module 116 is an antenna array, the antenna array comprises a plurality of directional antennas, and the plurality of directional antennas can be selectively disabled or enabled. In addition, the processor 110 comprises a plurality of Modulation and Coding Scheme code (MCS) codes, which comprises all the MCS codes supported by the electronic device 120.

Figure 2:
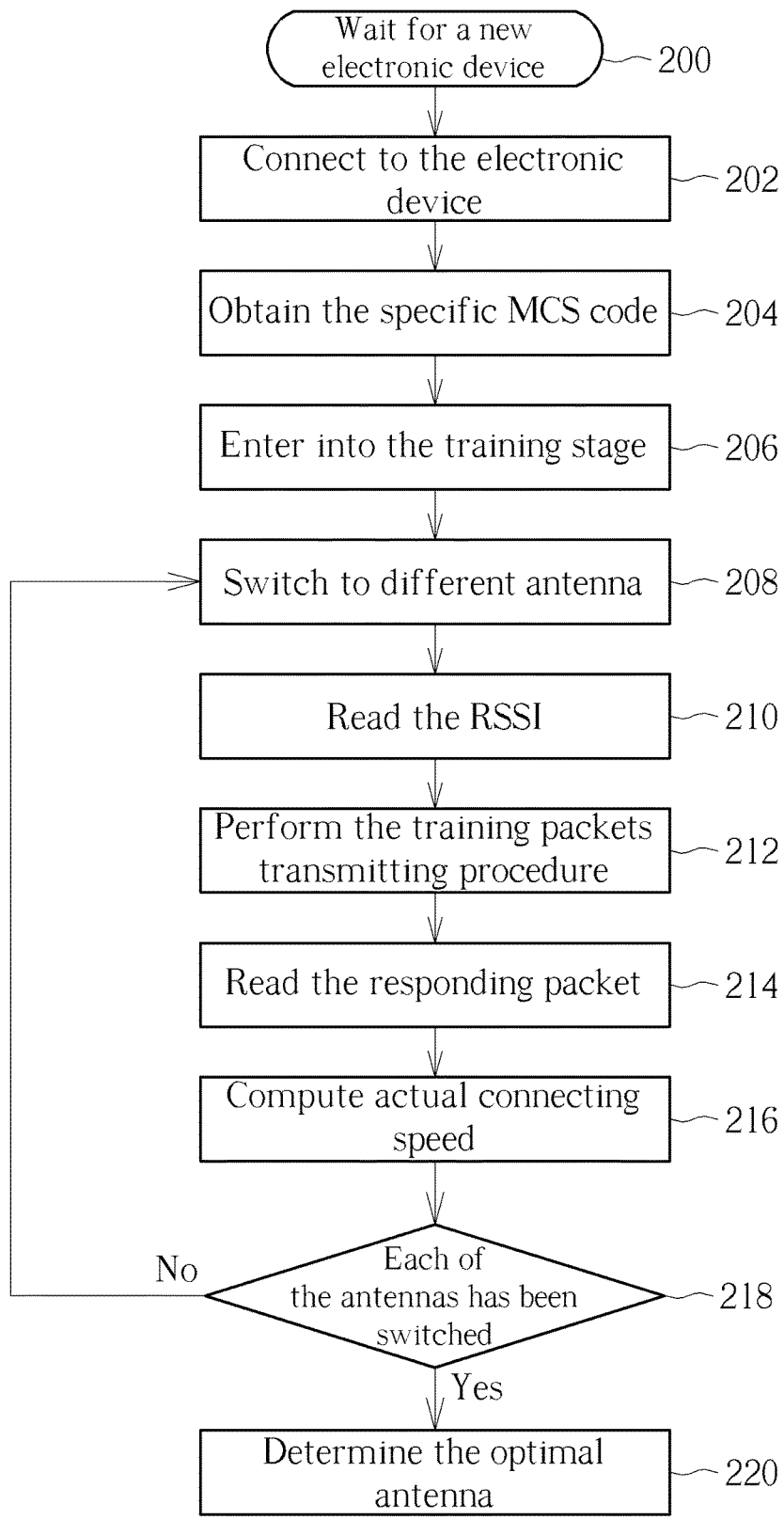
FIG. 2 is a flowchart illustrating an antenna selecting method applied in the access point of FIG. 1 according to an embodiment of the present invention.
Figure 3:
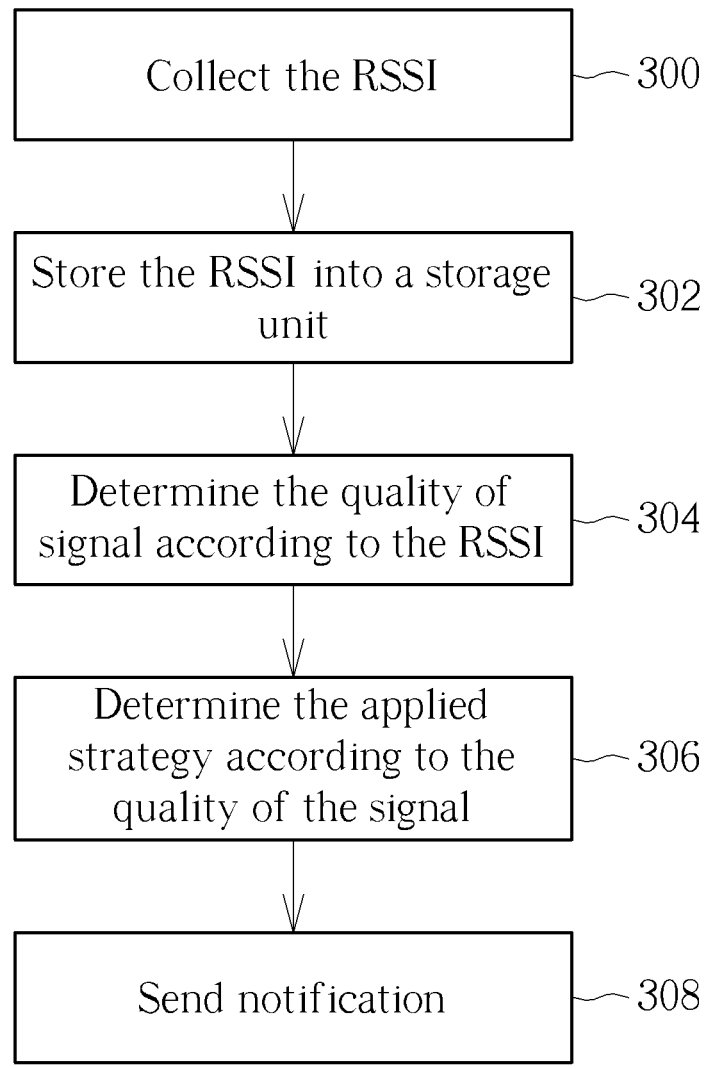
FIG. 3 is a flowchart illustrating an antenna selecting method applied in the access point of FIG. 1 according to another embodiment of the present invention.

FIG. 2 is a flowchart illustrating an antenna selecting method applied in the access point 110 according to an embodiment of the present invention, wherein the following explanation assumes every antenna in the antenna module 116 is an antenna array, and the antenna array comprises a plurality of directional antennas. The flowcharts shown in FIGS. 2 and 3 are arranged to select a directional antenna from each antenna for obtaining a set of optimal antennas. For example, assuming the antenna module 116 comprises three antennas and each antenna comprises two directional antennas, then the flowchart shown in FIG. 2 is arranged to select a directional antenna from each antenna, respectively, and these three selected directional antennas constitute a set of optimal antennas. The flow in FIG. 2 is described as follows.

In step 200, the access point 110 is waiting to connect with a new electronic device; i.e. the access point 110 at this time has not yet connected with the electronic device 120. In step 202, the electronic device 120 connects with the access point 110, and performs a connection initialization operation. Next, in step 204, the access point 110 sends a plurality of non-training packets to the electronic device 120, e.g. using a "Ping" (Packet InterNet Grope) command for transmitting an Internet Control Message Protocol (ICMP) packet. At this time, the wireless network module 114 of the access point 110 computes a specific MCS code according to the response of the electronic device 120 for connecting and transmitting packets to the electronic device 120.

In step 206, the access point 110 starts the training stage to decide a set of optimal antennas adapted to the electronic device 120; in step 208, the access point 110 switches the directionality of each antenna by choosing one of the directional antennas from each antenna. In step 210, the access point 110 reads the Received Signal Strength Indication (RSSI) of the received packet.

In step 212, the access point 110 starts performing the training packets transmitting procedure, i.e. transmits the plurality of training packets via the currently selected antenna to the electronic device 120. In step 214, the processor 112 reads the responding packet sent back by the electronic device, which corresponds to the plurality of training packets. More specifically, when the electronic device 120 receives a training packet successfully, the electronic device 120 immediately sends a responding packet to the access point 110 to inform that the training packet is received. Therefore, in step 214, the processor 112 reads the responding packet sent by the electronic device 120 and computes the number of received responding packets.

In step 216, the processor 112 computes the actual connecting speed between the access point 110 and the electronic device 120 according to the number of received responding packets. Assuming the access point 110 sends 10 packets to the electronic device 120 but the electronic device 120 only receives 5 training packets successfully, only 5 responding packets will be sent back to the access point 110. Therefore, the actual connecting speed between the access point 110 and the electronic device 120 is only half the predetermined connecting speed. In other words, if the predetermined connecting speed is 975 Mbps, the actual connecting speed is 487.5 Mbps (975/2=487.5). It should be noted that the actual determined connecting speed in this step is arranged for representing the transmitting quality of the current employing antenna. In other embodiments of the present invention, the actual connecting speed can be replaced with another similar meaningful indication/value, such as the success/failure rate of transmitting training packets.

In step 218, the processor 112 determines whether each of the antennas has been switched. If this is true, the flow goes into step 220; otherwise, the flow goes back to the step 208 to switch to the antenna which has not yet performed the training packet transmitting procedure.

In step 220, the processor 112 determines a set of optimal antennas adapted to the electronic device 120 according to the RSSI received by each antenna in step 210 and the actual connection speed mentioned in step 216, and uses the determined set of optimal antennas as the transmission medium between the access point 110 and the electronic device 120.

As mentioned above, in the flow shown in FIG. 2, because the access point 110 only uses one MCS code during the whole training stage to train all the antennas to perform the transmission of training packet, the operation time of the training stage is considerably reduced without switching the other MCS codes.

Table 1 shown below is a table for the data rate and MCS code when the number of spatial streams (NSS) equals 3 and corresponds to IEEE 802.11ac_VHT80, where the table is supported by the electronic device 120:

TABLE 1

| Data rate(Mbps) | 1300 | 1170 | 975 | 877.5 | 780 | 585 | 390 |
|---|---|---|---|---|---|---|---|
| MCS code | 0xE9 | 0xE8 | 0xE7 | 0xE6 | 0xE5 | 0xE4 | 0xD4 |
| Data reate(Mbps) | 260 | 195 | 97.5 | 65 | 32.5 | 390 | |
| MCS code | 0xD3 | 0xD2 | 0xC2 | 0xC1 | 0xC0 | 0xD4 | |

In the embodiment, the antenna module 116 comprises three antennas and each antenna comprises two directional antennas. As each antenna needs to select one directional antenna, the antennas need to be switched 8 times (2*2*2=8). Based on the prior art method, all of the 12 MCS codes are performed while the access point 110 switches antennas during the training operation, so the number of training steps is 96 (8*12=96). In the embodiment shown in FIG. 2, the number of training steps is only 8, so the operating time of the training stage is considerably reduced. Moreover, if there is a second electronic device communicating with the access point 110, in which the second electronic device supports 16 MCS codes, the processor 112 of the access point 110 comprises a table includes all MCS codes supported by the electronic device 120 and the second electronic device.

Although a set of optimal antennas is determined in the embodiment shown in FIG. 2, in another embodiment of the present invention, only one optimal antenna needs to be determined for the following transmission. One skilled in the art should understand how to implement this method after reading the explanation above, so the detailed description is omitted here for brevity.

In addition, after the processor 112 determines a set of optimal antennas adapted to the electronic device 110, and when the access point 110 uses the set of optimal antennas to perform data transmission with the electronic device 120, the connecting quality between the access point 110 and the electronic device 120 may change due to some factors, e.g. a user moves the electronic device 120, which means the current transmitting antennas are no longer a set of optimal antennas. Therefore, in another embodiment of the present invention, the processor 112 further comprises an RSSI detecting procedure, and the processor 112 determines whether the access point 112 re-operates in the training stage according to the detected RSSI to re-determine an optimal antenna or a set of optimal antennas adapted to the electronic device 120. FIG. 3 is a flowchart illustrating an antenna selecting method applied in the access point 110 according to another embodiment of the present invention. The flow is described as follows.

In step 300, the access point 110 connects with the electronic device 120. At this time, the access point 110 continuously receives signals from the electronic device 120, and the processor 112 collects the RSSI by the received signals. In step 302, the processor 112 stores the collected RSSI into a storage unit positioned within or outside the processor. Next, in step 304, the processor 112 determines the quality of the received signal according to the RSSI of the storage unit. The quality of the received signal can be determined by the number of times that the variance of the RSSI exceeds a standard value, or other indications/parameters can determine the quality of signal.

Next, in step 306, the processor 112 determines the applied strategy according to the quality of the received signal. Assuming the RSSI is very low, and the processor 112 determines the signal quality satisfies a first condition, the processor 112 controls the access point 110 to operates in a training stage, i.e., executing the operations of steps 206 to 220. If the RSSI is low enough to make the processor determine the system is disconnected, then the training antenna procedure may stop. In addition, assuming the RSSI is very high, and the processor 112 determines the signal quality satisfies a second condition, the processor 112 control the antenna module 116 to perform a omni-directional antenna procedure, i.e., the radiation magnitude in all directions is substantially the same to perform data transmission with the electronic device 120.

Next, in step 308, the processor 112 sends a notification message to the corresponding modules to perform a corresponding operation according to the operating strategy determined in step 306, i.e., executing the operations of step 206 to 220 or perform the omni-directional antenna procedure.

Briefly summarized, in the access point of the present invention, at least one optimal antenna adapted to the electronic 120 can be determined without switching the MCS code. Therefore, the operating time in the operating stage for the access point 110 can be considerably reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An access point for communicating with an electronic device, the access point comprising:
   an antenna module, comprising a plurality of antennas;
   a wireless network module, coupled to the antenna module; and
   a processor, coupled to the wireless network module, wherein the processor includes a plurality of Modulation and Coding Scheme code (MCS) codes supported by the electronic device;
   wherein when the access point operates in a training stage to determine at least one optimal antenna for communicating with the electronic device, the processor utilizes only one specific MCS code from the plurality of MCS codes to transmit a plurality of training packets to the electronic device via the wireless network module during the training stage without switching other MCS codes for determining the at least one optimal antenna for communicating with the electronic device.

2. The access point of claim 1, wherein the processor only utilizes said only one specific MCS code to transmit the plurality of training packets to the electronic device via the wireless network module and the antenna module for determining the at least one optimal antenna for communicating with the electronic device.

3. The access point of claim 1, wherein before the access point operates in the training stage for determining the optimal antenna for the electronic device, the wireless network module determines said only one specific MCS code for being used by the processor when operating in the training stage.

4. The access point of claim 1, wherein, prior to determining the at least one optimal antenna, the processor transmits at least one non-training packet to the electronic and determines said only one specific MCS code according to a responding packet, wherein the responding packet is transmitted by the electronic device and is corresponding to the non-training packet.

5. The access point of claim 1, wherein after the processor determines the at least one optimal antenna for communicating with the electronic device, and the access point uses the at least one optimal antenna to perform data transmission with the electronic device, the processor constantly detects a signal quality of a received signal, and determines whether the access point re-operates in the training stage and re-determine the at least one optimal antenna for communicating with the electronic device according to the signal quality.

6. The access point of claim 5, wherein when the signal quality satisfies a first determining condition, the processor controls the access point to re-operate in the training stage; and when the signal quality satisfies a second determining condition, the processor executes an omni-directional antenna procedure to the antenna module for data transmission with the electronic device.

7. The access point of claim 1, wherein each antenna in the antenna module comprises a plurality of directional antennas, and when the access point operates in the training stage, the access point selects one directional antenna from each antenna based on said only one specific MCS code for determining a set of optimal antennas for communicating with the electronic device.

8. An antenna selecting method of an access point, wherein the access point for communicating with an electronic device a plurality of Modulation and Coding Scheme code (MCS) codes supported by the electronic device, and the access point further comprises an antenna module, and the antenna module comprises a plurality of antennas, and the antenna selecting method comprises:
   connecting with the electronic device, and operating in a training stage;
   utilizing only one specific MCS code from the plurality of MCS codes to transmit a plurality of training packets to the electronic device during the training stage without switching other MCS codes; and
   determining at least one optimal antenna for communicating with the electronic device according to a response of the electronic device, wherein the response is corresponding to the plurality of training packets.

9. The antenna selecting method of claim 8, wherein the step of transmitting the plurality of training packets to the electronic device comprises:
   utilizing said only one specific MCS code to transmit the plurality of training packets to the electronic device when operating in the training stage for determining the at least one optimal antenna for communicating with the electronic device.

10. The antenna selecting method of claim 8, further comprising:
    before the access point operates in the training stage for determining the at least one optimal antenna for the electronic device, determining said only one specific MCS code for being used by the processor when operating in the training stage.

11. The antenna selecting method of claim 8, further comprising:
    wherein, prior to determining the at least one optimal antenna, the access point transmits at least one non-training packet to the electronic device and determines said only one specific MCS code according to a responding packet, wherein the responding packet is transmitted by the electronic device and is corresponding to the non-training packet.

12. The antenna selecting method of claim 8, further comprising:
    after the access point determines the at least one optimal antenna for communicating with the electronic device, and the access point uses the at least one optimal antenna to perform data transmission with the electronic device, the access point constantly detects a signal quality of a received signal, and determines whether the access point re-operates in the training stage and re-determines the at least one optimal antenna for communicating with the electronic device according to the signal quality.

13. The antenna selecting method of claim 12, further comprising:
  the access point re-operates in the training stage when the signal quality satisfies a first determining condition; and
  executing an omni-directional antenna procedure to the antenna module for data transmission with the electronic device when the signal quality satisfies a second determining condition.

14. The antenna selecting method of claim 8, wherein each antenna in the antenna module comprises a plurality of directional antennas, and when the access point operates in the training stage, the access point selects one directional antenna from each antenna based on said only one specific MCS code for determining a set of optimal antennas for communicating with the electronic device.

\* \* \* \* \*